United States Patent
Tsai

(10) Patent No.: US 10,816,885 B2
(45) Date of Patent: Oct. 27, 2020

(54) ILLUMINATION SYSTEM, PROJECTION APPARATUS, AND PROJECTION METHOD OF PROJECTION APPARATUS

(71) Applicant: Coretronic Corporation, Hsin-Chu (TW)

(72) Inventor: Chih-Hsien Tsai, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 16 days.

(21) Appl. No.: 16/436,928

(22) Filed: Jun. 11, 2019

(65) Prior Publication Data

US 2019/0384148 A1 Dec. 19, 2019

(30) Foreign Application Priority Data

Jun. 13, 2018 (CN) .......................... 2018 1 0606382

(51) Int. Cl.
*G03B 21/14* (2006.01)
*G03B 21/20* (2006.01)
*G02B 26/00* (2006.01)

(52) U.S. Cl.
CPC ......... *G03B 21/204* (2013.01); *G02B 26/008* (2013.01)

(58) Field of Classification Search
CPC ...... G03B 21/204; G03B 21/008; H04N 9/31; H04N 9/3111; H04N 9/312; H04N 9/3161; H04N 9/3182; H04N 9/3105
See application file for complete search history.

(56) References Cited

U.S. PATENT DOCUMENTS

| 2013/0322056 | A1 | 12/2013 | Konuma et al. |
| 2014/0168613 | A1 | 6/2014 | Wang et al. |
| 2016/0215947 | A1 | 7/2016 | Matsuno |
| 2019/0331995 | A1* | 10/2019 | Chen ...................... G03B 21/16 |
| 2019/0346755 | A1* | 11/2019 | Hsieh ................ G03B 21/2013 |
| 2019/0384150 | A1* | 12/2019 | Tsai ..................... G03B 21/204 |
| 2020/0012178 | A1* | 1/2020 | Pan .................... G03B 21/2066 |
| 2020/0050093 | A1* | 2/2020 | Liao ..................... G03B 21/204 |
| 2020/0073218 | A1* | 3/2020 | Yamamoto ............... G02B 5/04 |
| 2020/0133108 | A1* | 4/2020 | Noda ................... H04N 9/3144 |
| 2020/0192204 | A1* | 6/2020 | Tarpan ................. G03B 21/204 |

FOREIGN PATENT DOCUMENTS

CN 105022217 9/2017

* cited by examiner

*Primary Examiner* — William C. Dowling
(74) *Attorney, Agent, or Firm* — JCIPRNET

(57) ABSTRACT

An illumination system, a projection apparatus, and a projection method of the projection apparatus are provided. The illumination system includes an excitation light source, a light combination element, a light wavelength conversion module, and an actuator. The light combination element is disposed on a transmission path of an excitation beam emitted from the excitation light source. The light wavelength conversion module is disposed on a transmission path of the excitation beam transmitted from the light combination element and has a plurality of optical areas. The actuator is coupled to the light combination element to change a rotation angle of the light combination element, such that the excitation beam transmitted from the light combination element is transmitted to the plurality of optical areas of the light wavelength conversion module via different transmission paths.

16 Claims, 16 Drawing Sheets

ILLUMINATION SYSTEM, PROJECTION APPARATUS, AND PROJECTION METHOD OF PROJECTION APPARATUS

CROSS-REFERENCE TO RELATED APPLICATION

This application claims the priority benefit of China application serial no. 201810606382.0, filed on Jun. 13, 2018. The entirety of the above-mentioned patent application is hereby incorporated by reference herein and made a part of this specification.

BACKGROUND OF THE INVENTION

1. Field of the Invention

The invention relates to an optical system, a display device using the optical system, and a projection method of the display device, and in particular, to an illumination system, a projection apparatus, and a projection method of the projection apparatus.

2. Description of Related Art

In general, a projection apparatus includes an illumination system, a light valve, and a projection lens. The illumination system usually generates required color light using an excitation light source in conjunction with a phosphor wheel, and improves the color purity of the color light by means of a filter wheel. In the illumination system of the prior art, the phosphor wheel and the filter wheel must be rotated synchronously in order to successfully output various beams of color light in corresponding time periods. However, because the light valve capable of supporting the synchronous rotation of the phosphor wheel and the filter wheel is very expensive, it is impossible to effectively reduce the cost of the projection apparatus using this kind of illumination system.

The information disclosed in this "BACKGROUND OF THE INVENTION" section is only for enhancement of understanding of the background of the described technology and therefore it may contain information that does not form the prior art that is already known to a person of ordinary skill in the art. The information disclosed in this "BACKGROUND OF THE INVENTION" section does not represent the problems to be resolved by one or more embodiments of the invention, and it also does not mean that the information is acknowledged by a person of ordinary skill in the art before the application of the invention.

SUMMARY OF THE INVENTION

The invention provides an illumination system, which is conducive to reduction of manufacturing cost of an illumination system.

The invention provides a projection apparatus using the aforementioned illumination system, such that the projection apparatus has an effect of low cost.

The invention also provides a projection method of the aforementioned projection apparatus, which is conducive to reduction of time cost for signal processing of the projection apparatus.

Other objects and advantages of the invention can be further illustrated by the technical features broadly embodied and described as follows.

In order to achieve one, a portion of, or all of the aforementioned objectives or other objectives, an embodiment of the invention provides an illumination system, which includes an excitation light source, a light combination element, a light wavelength conversion module, and an actuator. The excitation light source is adapted to provide an excitation beam. The light combination element is disposed on a transmission path of the excitation beam emitted from the excitation light source. The light wavelength conversion module is disposed on a transmission path of the excitation beam transmitted from the light combination element and has a plurality of optical areas. The actuator is coupled to the light combination element to change a rotation angle of the light combination element, such that the excitation beam transmitted from the light combination element is transmitted to the plurality of optical areas of the light wavelength conversion module via different transmission paths.

In order to achieve one, a portion of, or all of the aforementioned objectives or other objectives, an embodiment of the invention provides a projection apparatus, which includes the aforementioned illumination system, a light valve and a projection lens. The light valve is disposed on a transmission path of an illumination beam output from the illumination system and converts the illumination beam into an image beam. The projection lens is disposed on a transmission path of the image beam.

In order to achieve one, a portion of, or all of the aforementioned objectives or other objectives, an embodiment of the invention provides a projection method of the aforementioned projection apparatus, which includes steps as follow: turning on the excitation light source to provide the excitation beam; and changing a rotation angle of the light combination element by the actuator, such that the excitation beam transmitted from the light combination element is transmitted to the plurality of optical areas of the light wavelength conversion module via different transmission paths.

Based on the foregoing, the embodiments of the invention have at least one of the following advantages or effects. In the embodiments of the illumination system and the projection method of the projection apparatus of the invention, the actuator controls the rotation angle of the light combination element, such that the excitation beam transmitted from the light combination element is transmitted to different optical areas on the light wavelength conversion module at different time periods. Therefore, the rotation of the filter module and the rotation of the light wavelength conversion module may not be synchronous (the light wavelength conversion module may rotate or may not rotate). That is to say, the projection apparatus using the illumination system and the projection method of the projection apparatus of the invention may adopt a light valve only supporting synchronous rotation with the filter module, thereby reducing the cost. Accordingly, the illumination system and the projection method of the projection apparatus of the invention are conducive to reduction of the cost of the projection apparatus. Moreover, the cost of the projection apparatus of the invention is low.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate exemplary embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1A:
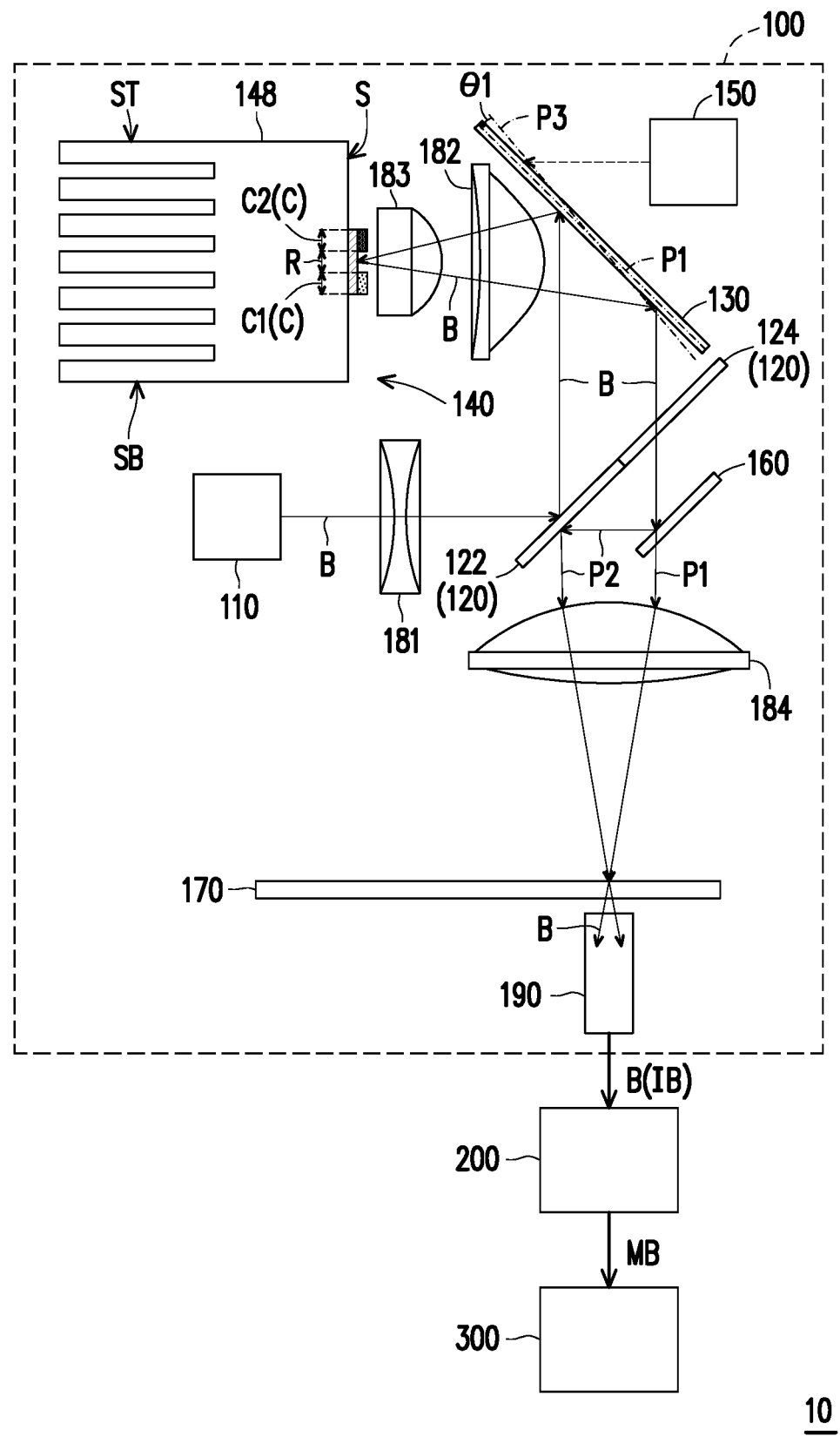
FIG. 1A to FIG. 1C are schematic diagrams of a projection apparatus within a first time period to a third time period in a first embodiment of the invention respectively.
Figure 1B:
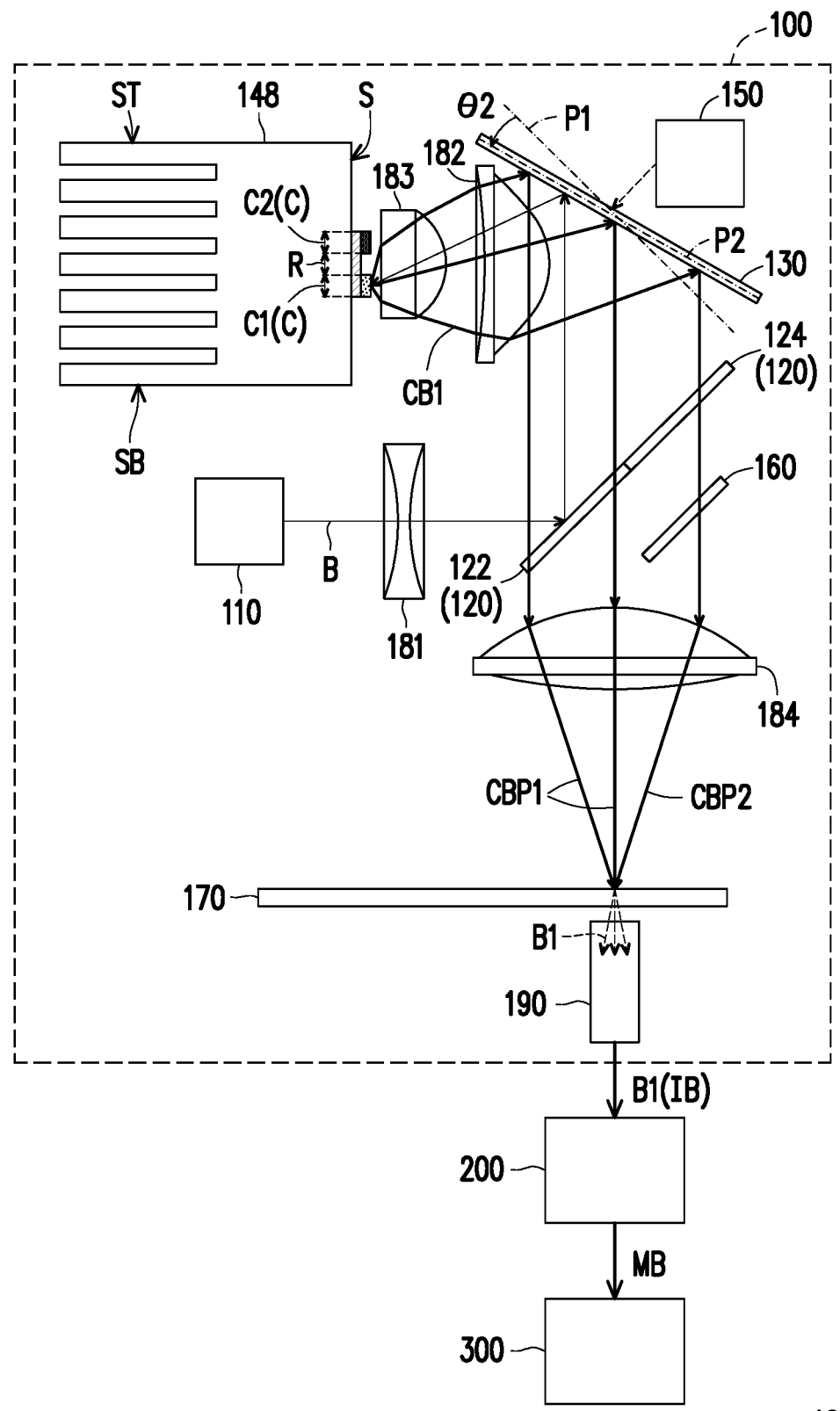
Figure 1C:
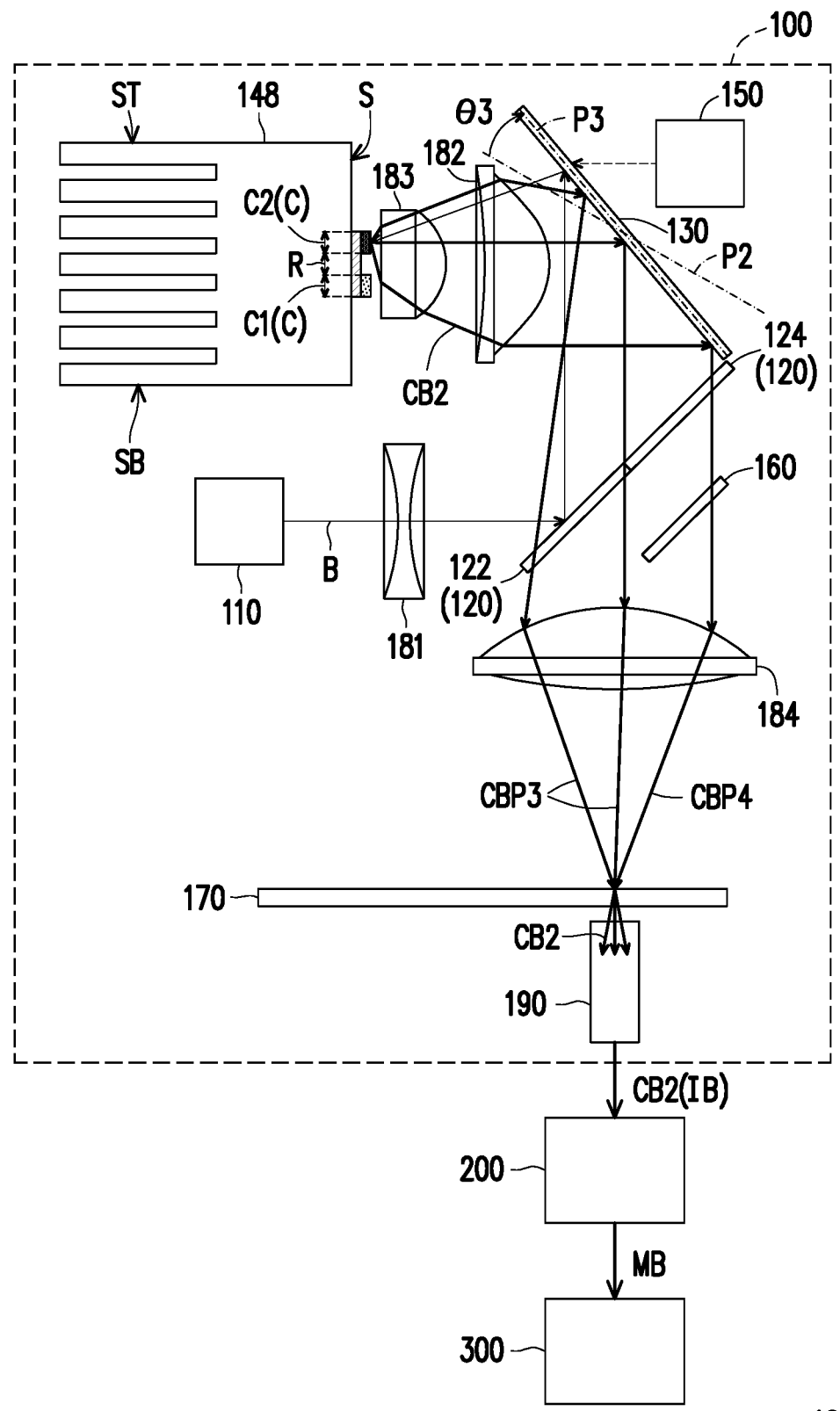
Figure 2A:
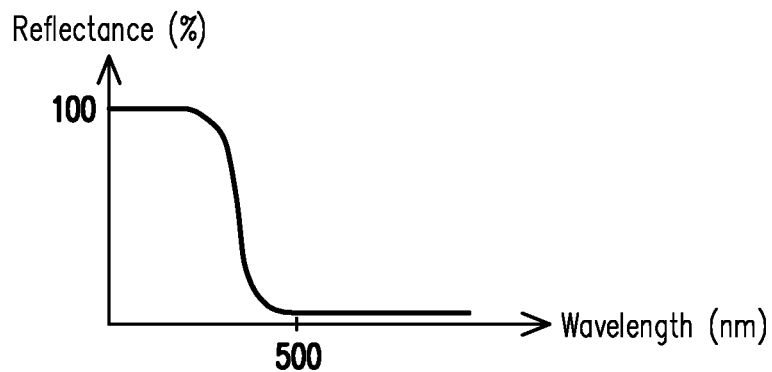
FIG. 2A is a schematic diagram of a relationship between the wavelength and reflectance of a dichroic portion of a light combination element in the first embodiment of the invention.
Figure 2B:
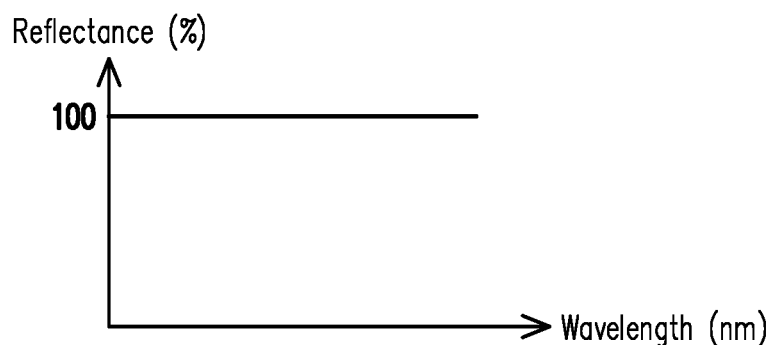
FIG. 2B is a schematic diagram of a relationship between the wavelength and transmittance of a penetration portion of a light combination element in the first embodiment of the invention.
Figure 2C:
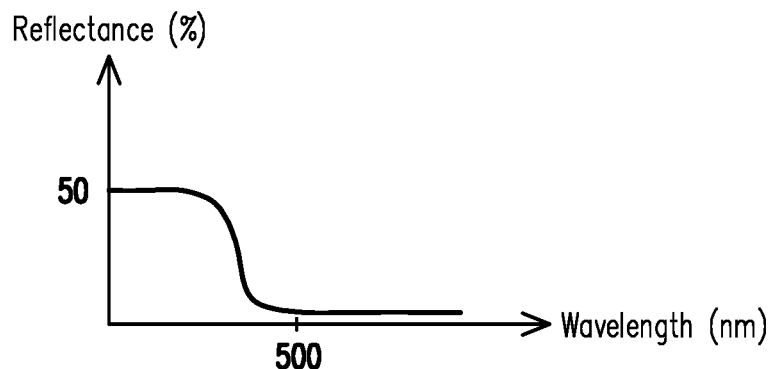
FIG. 2C is a schematic diagram of a relationship between the wavelength and reflectance of a partially transmissive partially reflective element in the first embodiment of the invention.
Figure 3:
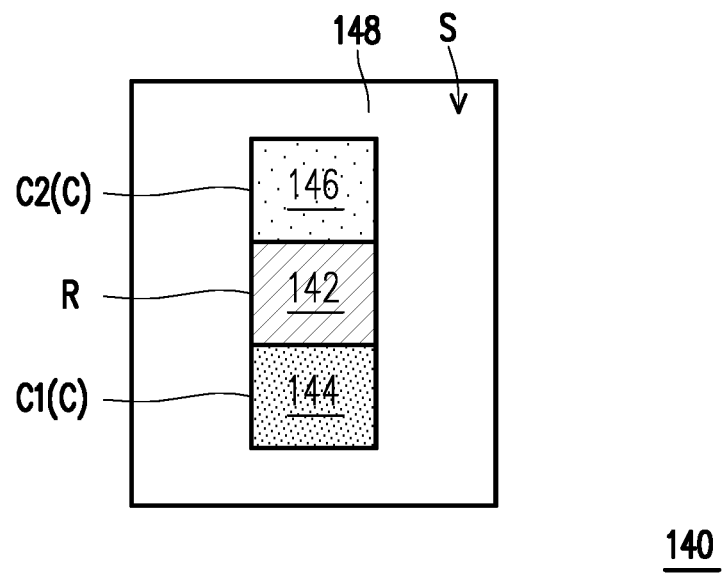
FIG. 3 is a front view of an implementation type of a light wavelength conversion module in the first embodiment of the invention.
Figure 4:
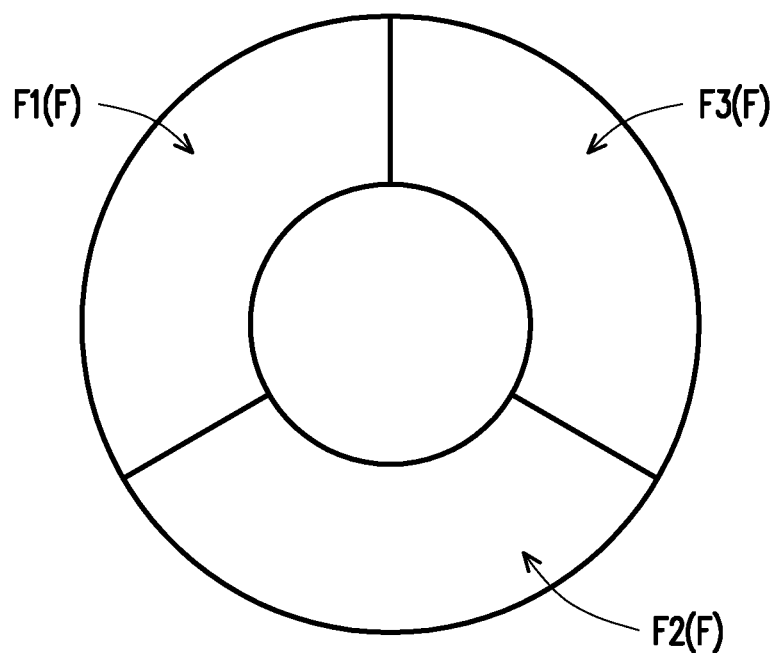
FIG. 4 is a front view of an implementation type of a filter module in the first embodiment of the invention.
Figure 5:
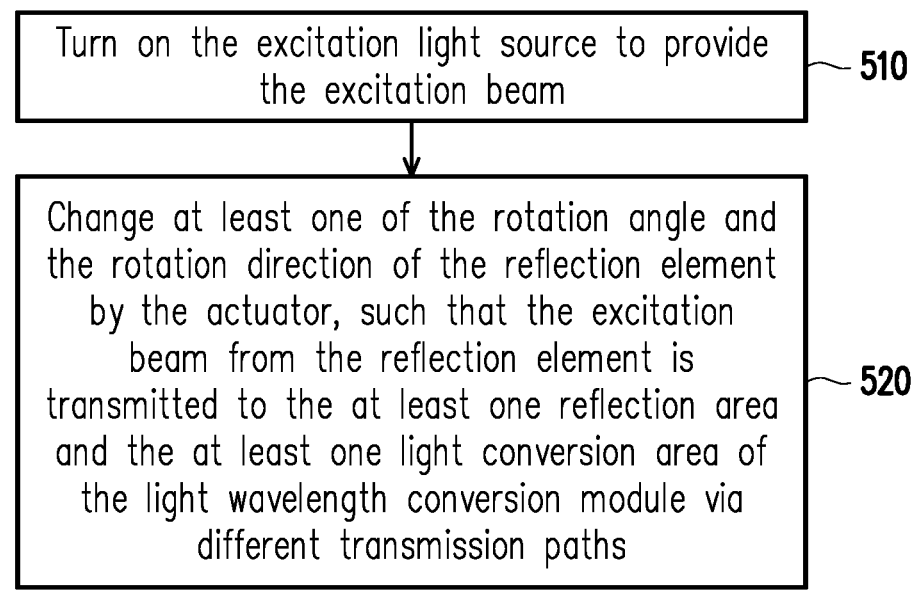
FIG. 5 is a flowchart of a projection method of the projection apparatus in the first embodiment of the invention.

FIG. 1A to FIG. 1C are schematic diagrams of a projection apparatus within a first time period to a third time period in a first embodiment of the invention respectively. FIG. 2A is a schematic diagram of a relationship between the wavelength and reflectance of a dichroic portion of a light combination element in the first embodiment of the invention. FIG. 2B is a schematic diagram of a relationship between the wavelength and transmittance of a penetration portion of a light combination element in the first embodiment of the invention. FIG. 2C is a schematic diagram of a relationship between the wavelength and reflectance of a partially transmissive partially reflective element in the first embodiment of the invention. FIG. 3 is a front view of an implementation type of a light wavelength conversion module in the first embodiment of the invention. FIG. 4 is a front view of an implementation type of a filter module in the first embodiment of the invention. FIG. 5 is a flowchart of the projection method of a projection apparatus in the first embodiment of the invention.

Referring to FIG. 1A to FIG. 1C, a projection apparatus 10 includes an illumination system 100, a light valve 200 and a projection lens 300. The illumination system 100 outputs an illumination beam IB, wherein the illumination beam IB includes an excitation beam B output from the illumination system 100 in FIG. 1A, a first color beam BI output from the illumination system 100 in FIG. 1B and a conversion beam CB2 output from the illumination system 100 in FIG. 1C. The light valve 200 is disposed on a transmission path of the illumination beam IB and converts the illumination beam IB into an image beam MB. For example, the light valve 200 is, but not limited to, a digital micro-mirror device (DMD), a liquid-crystal-on-silicon (LCOS) panel or a transmissive liquid crystal panel. The projection lens 300 is disposed on a transmission path of the image beam MB to project the image beam MB to a screen, a wall or other imageable objects.

The illumination system 100 includes an excitation light source 110, a light combination element 120, a reflection element 130, a light wavelength conversion module 140, and an actuator 150. The excitation light source 110 is adapted to provide an excitation beam B. For example, the excitation light source 110 includes a single light emitting element or the excitation light source 110 includes a plurality of light emitting elements. The light emitting element may include a laser diode, a light emitting diode or a combination of the aforementioned two light emitting elements. In addition, the plurality of light emitting elements may be arranged in an array. The light combination element 120 is disposed on a transmission path of the excitation beam B emitted from the excitation light source 110. In the embodiment, the light combination element 120 includes a dichroic portion 122 and a penetration portion 124.

As shown in FIG. 1A, the dichroic portion 122 is disposed on the transmission path of the excitation beam B emitted from the excitation light source 110, and the dichroic portion 122 is adapted to reflect the excitation beam B. The dichroic portion 122 is, for example, a dichroic layer disposed on the light combination element 120. In addition, the penetration portion 124 is disposed on a transmission path of the excitation beam B sequentially reflected by a reflection area R of the light wavelength conversion module 140 and the reflection element 130, and the penetration portion 124 allows the excitation beam B to pass through. The penetration portion 124 is, for example, a substrate made of transparent material, the transparent material is glass, for example.

As shown in FIG. 1B (or FIG. 1C), the dichroic portion 122 is also disposed on a transmission path of a conversion beam CB1 (or conversion beam CB2) sequentially reflected by a light conversion area C1 (or light conversion area C2) of the light wavelength conversion module 140 and the reflection element 130, and the dichroic portion 122 allows the conversion beam CB1 (or conversion beam CB2) to pass through. In addition, the penetration portion 124 is also disposed on the transmission path of the conversion beam CB1 (or conversion beam CB2) sequentially reflected by the light conversion area C1 (or light conversion area C2) of the light wavelength conversion module 140 and the reflection element 130, and the penetration portion 124 allows the conversion beam CB1 (or conversion beam CB2) to pass through.

The reflectance of the dichroic portion 122 and the transmittance of the penetration portion 124 are designed according to wavelength bands of the excitation beam B, the conversion beam CB1 and the conversion beam CB2. In the embodiment, the excitation beam B, the conversion beam CB1 and the conversion beam CB2 are a blue beam, a yellow beam and a green beam, respectively. Therefore, the dichroic portion 122 is adapted to reflect the excitation beam B and allow the conversion beam CB1 and the conversion beam CB2 to pass through, the reflectance of the dichroic portion 122 is equal to or approximate to 100% at a blue light band, and the reflectance of the dichroic portion 122 is equal to or approximate to 0% at a yellow light band, a green light band and other long-wavelength bands, as shown in FIG. 2A. In addition, the transmittance of the penetration portion 124 (which allows the excitation beam B, the conversion beam CB1 and the conversion beam CB2 to pass through) is equal to or approximate to 100% at the blue light band, the yellow light band, the green light band and other long-wavelength bands, as shown in FIG. 2B.

The reflection element 130 is disposed on a transmission path of the excitation beam B transmitted from the light combination element 120. In the embodiment, the reflection element 130 is disposed on a transmission path of the excitation beam B passing through the dichroic portion 122 of the light combination element 120. The reflection element is adapted to reflect the excitation beam B, the conversion beam CB1 and the conversion beam CB2. For example, the reflection element may be a reflection mirror, a substrate having a reflection coating layer or any other elements for reflecting light beams.

The light wavelength conversion module 140 is disposed on a transmission path of the excitation beam B transmitted from the reflection element 130. The light wavelength conversion module 140 has at least one reflection area R and at least one light conversion area C. In the embodiment, the light wavelength conversion module 140 has a reflection area (the reflection area R as shown in FIG. 3) and two light conversion areas C (the light conversion area C1 and the light conversion area C2 as shown in FIG. 3). In addition, the reflection area R, the light conversion area C1 and the light conversion area C2 are distributed in a strip form. As shown in FIG. 3, the light conversion area C1 and the light conversion area C2 may be disposed on two opposite sides of the reflection area R, respectively. However, the respective number of the reflection area R and the light conversion areas C in the light wavelength conversion module 140 and the arrangement of the reflection area R and the light conversion areas C are not limited to those shown in FIG. 3.

The reflection area R is adapted to reflect the excitation beam B, and the light conversion area C (such as the light conversion area C1 and the light conversion area C2) is adapted to convert the excitation beam B into the conversion beam (such as the conversion beam CB1 and the conversion beam CB2) and reflect the conversion beam. The excitation beam B reflected by the reflection area R and the conversion beam reflected by the light conversion area C are reflected by the reflection element 130 and thus transmitted back to the light combination element 120.

For example, a reflection layer or a reflection element may be provided in the reflection area R. In addition, a light wavelength conversion material and a reflection layer (or a reflection element) may be provided in the light conversion area C. The light wavelength conversion material may be phosphor powder, quantum dots or a combination of the two materials. Light scattering particles may also be selectively provided in the light conversion area C to improve the conversion efficiency. In the embodiment, the light wavelength conversion module 140 includes a reflection layer 142, a light wavelength conversion material 144 and a light wavelength conversion material 146. The reflection layer 142 is provided in the light conversion area C1, the reflection area R and the light conversion area C2. The light wavelength conversion material 144 is provided in the light conversion area C1, and the light wavelength conversion material 144 is adapted to convert the excitation beam B into the conversion beam CB1. The light wavelength conversion material 146 is provided in the light conversion area C2, and the light wavelength conversion material 146 is adapted to convert the excitation beam B into the conversion beam CB2.

The light wavelength conversion module 140 may also selectively include a heat sink 148 for heat dissipation. Specifically, the reflection area R and the light conversion area C are disposed on the heat sink 148. As shown in FIG. 1A to FIG. 1C, the reflection layer 142 may be disposed on a surface S, facing the reflection element 130, of the heat sink 148, and the reflection layer 142 may be located between the light wavelength conversion material 144 and the heat sink 148 and located between the light wavelength conversion material 146 and the heat sink 148. However, the number of elements in the light wavelength conversion module 140 and a relative configuration relationship therebetween may be changed as required.

The actuator 150 is coupled to the reflection element 130, and the actuator 150 is adapted to drive the reflection element 130 to swing, so as to change at least one of a rotation angle and rotation direction of the reflection element 130, thereby transferring the excitation beam B transmitted from the reflection element 130 to the reflection area R, the light conversion area C1 and the light conversion area C2 via different transmission paths.

Specifically, the rotation angle and rotation direction of the reflection element 130 may be determined according to dimensions, relative distances and relative configuration relationships of the reflection area R, the light conversion area C1 and the light conversion area C2, and other parameters. In the embodiment, the reflection area R is disposed between the light conversion area C1 and the light conversion area C2, wherein the light conversion area C1 is closer to a bottom surface SB of the heat sink 148 than the light conversion area C2. Under this framework, when a projection area of the excitation beam B is to be changed from the reflection area R to the light conversion area C1, as shown in FIG. 1B, the reflection element 130 may be rotated counterclockwise by a second rotation angle θ2 from an inclination plane P1 where the reflection element 130 is located in FIG. 1A to an inclination plane P2, such that the speckle of the excitation beam B originally projected to the reflection area R move into the light conversion area C1 toward the bottom surface SB of the heat sink 148. When the projection area of the excitation beam B is to be changed from the light conversion area C1 to the light conversion area C2, as shown in FIG. 1C, the reflection element 130 may be rotated clockwise by a third rotation angle θ3 from the inclination plane P2 where the reflection element 130 is located in FIG. 1B to an inclination plane P3, such that the speckle of the excitation beam B originally projected to the light conversion area C1 move into the light conversion area C2 toward a top surface ST of the heat sink 148. When a projection area of the excitation beam B is to be changed from the light conversion area C2 to the reflection area R, as shown in FIG. 1A, the reflection element 130 may be rotated counterclockwise by a first rotation angle θ1 from the inclination plane P3 where the reflection element 130 is located in FIG. 1C to the inclination plane P1, such that the speckle of the excitation beam B originally projected to the light conversion area C2 move into the reflection area R toward the bottom surface SB of the heat sink 148. More specifically, the reflection element 130, depending on the actuator 150, swings so as to generate the first rotation angle θ1, the second rotation angle θ2 and the third rotation angle θ3 according to a center axis of the reflection element 130 (not shown).

The illumination system 100 may selectively include other elements according to different demands. For example, the illumination system 100 may further include a partially transmissive partially reflective element 160. As shown in FIG. 1A, the partially transmissive partially reflective element 160 is disposed on the transmission path of the excitation beam B passing through the penetration portion 124, wherein the partially transmissive partially reflective element 160 allows a first part P1 of the excitation beam B passing through the penetration portion 124 to pass through, and the partially transmissive partially reflective element 160 reflects a second part P2 of the excitation beam B passing through the penetration portion 124. The dichroic portion 122 is also disposed on the transmission path of the second part P2 reflected by the partially transmissive partially reflective element 160, and the dichroic portion 122 reflects the second part P2. As shown in FIG. 1B (or FIG. 1C), the partially transmissive partially reflective element 160 is also disposed on the transmission path of the conversion beam CB1 (or conversion beam CB2) passing through the penetration portion 124, and the partially transmissive partially reflective element 160 allows the conversion beam CB1 (or conversion beam CB2) to pass through. For example, the reflectance of the partially transmissive partially reflective element 160 is equal to or approximate to 50% at the blue light band, and the reflectance of the partially transmissive partially reflective element 160 is equal to or approximate to 0% at the yellow light band, the green light band and other long-wavelength bands, as shown in FIG. 2C. However, the reflectance of the partially transmissive partially reflective element 160 at the blue light band may be adjusted according to actual demands, and is not limited to 50%. The partially transmissive partially reflective element 160 is, for example, a transparent substrate having a coating layer which allows 50% blue light to pass through and reflects 50% blue light, and may allow the yellow light band, the green light band and other long-wavelength bands to pass through.

The illumination system 100 may further include a filter module 170, so as to improve the color purity of the illumination beam IB. The filter module 170 is, for example, a filter wheel. The filter module 170 is disposed on transmission paths of the excitation beam B, the conversion beam CB1 and the conversion beam CB2 transmitted from the light combination element 120. The excitation beam B reflected by the reflection area R and the conversion beam (such as the conversion beam CB1 and the conversion beam CB2) reflected by the light conversion area C (such as the light conversion area C1 and the light conversion area C2) are transmitted toward the filter module 170 sequentially via the reflection element 130 and the light combination element 120.

The filter module 170 has a plurality of filter areas F such as a filter area F1, a filter area F2 and a filter area F3 as shown in FIG. 4. The filter area F1, the filter area F2 and the filter area F3 cut into the transmission paths of the excitation beam B, the conversion beam CB1 and the conversion beam CB2 transmitted from the light combination element 120 in turns. In the embodiment, the filter area F1 is a blue filter area. The filter area F1 may be provided with a filter which allows at least a portion of the excitation beam B (such as a blue beam) to pass through and filters out/absorbs the remaining color beams. In addition, the filter area F1 may have the characteristics of a diffuser to effectively improve the problem of laser speckles generated by laser. The filter area F2 is a red filter area. The filter area F2 may be provided with a filter which allows at least a portion of the first color beam B 1 (such as a red beam) to pass through and filters out/absorbs the remaining color beams. The filter area F3 is a green filter area. The filter area F3 may be provided with a filter which allows at least a portion of the conversion beam CB2 (such as a green beam) to pass through and filters out/absorbs the remaining color beams. However, the number of filter areas F included in the filter module 170, the arrangement sequence and the color of each filter area F may be changed as required, and are not limited to the above.

The illumination system 100 may further include a plurality of lens elements, so as to achieve the effect of converging beams or collimating beams. In the embodiment, the illumination system 100 includes a lens element 181, a lens element 182, a lens element 183, and a lens element 184. However, the number of lens elements and a relative arrangement relationship may be changed according to actual demands, and are not limited to those shown in FIG. 1A to FIG. 1C.

The illumination system 100 may further include a light uniformizing element 190. The light uniformizing element 190 is disposed on transmission paths of the excitation beam B, the first color beam B 1 and the conversion beam CB2 output from the filter module 170, so as to improve the uniformity of the illumination beam IB. For example, the light uniformizing element 190 is, but not limited to, a light Integration rod or a lens array.

Referring to FIG. 1A to FIG. 5, a projection method of the projection apparatus 10 includes steps as follow. First, turning on the excitation light source 110 to provide the excitation beam B (Step 510); and then, changing at least one of the rotation angle and rotation direction of the reflection element 130, such that the excitation beam B transmitted from the reflection element 130 is transmitted to the reflection area R and the light conversion area C of the light wavelength conversion module 140 via different transmission paths (Step 520).

In particular, referring to FIG. 1A, the filter area F1 of the filter module 170 cuts into the transmission path of the light beam transmitted from the lens element 184 within a first time period. The reflection element 130 is rotated to the first rotation angle θ1 via the actuator 150, such that the excitation beam B emitted from the excitation light source 110 is transmitted to the reflection area R of the light wavelength conversion module 140 sequentially via the lens element 181, the dichroic portion 122 of the light combination element 120, the reflection element 130 having the first rotation angle θ1, the lens element 182 and the lens element 183. The excitation beam B is then reflected by the reflection area R, sequentially pass through the lens element 183 and the lens element 182, and transmitted back to the reflection element 130 having the first rotation angle θ1, and the excitation beam B is reflected by the reflection element 130 having the first rotation angle θ1 again and thus transmitted to the light combination element 120. The excitation beam B transmitted to the light combination element 120 passes through the penetration portion 124 of the light combination element 120. The first part P1 of the excitation beam B passing through the penetration portion 124 of the light combination element 120 is transmitted to the filter module 170 through the lens element 184. The second part P2 of the excitation beam B passing through the penetration portion 124 of the light combination element 120 is sequentially reflected by the partially transmissive partially reflective element 160 and the dichroic portion 122 of the light combination element 120, and then transmitted to the filter module 170 through the lens element 184. The filter area F1 of the filter module 170 allows at least a portion of the excitation beam B to pass through. In other words, the illumination system 100 outputs the excitation beam B within the first time period.

Referring to FIG. 1B, the filter area F2 of the filter module 170 cuts into the transmission path of the light beam transmitted from the lens element 184 within a second time period. The reflection element 130 is rotated to the second rotation angle θ2 via the actuator 150, such that the excitation beam B emitted from the excitation light source 110 is transmitted to the light conversion area C1 of the light wavelength conversion module 140 sequentially via the lens element 181, the dichroic portion 122 of the light combination element 120, the reflection element 130 having the second rotation angle θ2, the lens element 182 and the lens element 183. The light conversion area C1 converts the excitation beam B into the conversion beam CB1 and reflects the conversion beam CB1. The conversion beam CB1 reflected by the light conversion area C1 is transmitted back to the reflection element 130 having the second rotation angle θ2 after sequentially passing through the lens element 183 and the lens element 182, and the conversion beam CB1 is reflected by the reflection element 130 having the second rotation angle θ2 and thus transmitted to the light combination element 120. A first part CBP1 of the conversion beam CB1 transmitted to the dichroic portion 122 of the light combination element 120 is transmitted to the filter module 170 through the lens element 184. A second part CBP2 of the conversion beam CB1 transmitted to the penetration portion 124 of the light combination element 120 is transmitted to the filter module 170 after sequentially passing through the partially transmissive partially reflective element 160 and the lens element 184. The filter area F2 of the filter module 170 allows a first color beam B 1 (such as a red beam) in the conversion beam CB1 (such as a yellow beam) to pass through, and filters out/absorbs a green beam in the conversion beam CB1. In other words, the illumination system 100 outputs the first color beam B 1 within the second time period.

Referring to FIG. 1C, the filter area F3 of the filter module 170 cuts into the transmission path of the light beam transmitted from the lens element 184 within a third time period. The reflection element 130 is rotated to the third rotation angle θ3 via the actuator 150, such that the excitation beam B emitted from the excitation light source 110 is transmitted to the light conversion area C2 of the light wavelength conversion module 140 sequentially via the lens element 181, the dichroic portion 122 of the light combination element 120, the reflection element 130 having the third rotation angle θ3, the lens element 182 and the lens element 183. The light conversion area C2 converts the excitation beam B into the conversion beam CB2 and reflects the conversion beam CB2. The conversion beam CB2 reflected by the light conversion area C2 is transmitted back to the reflection element 130 having the third rotation angle θ3 after sequentially passing through the lens element 183 and the lens element 182, and the conversion beam CB2 is reflected by the reflection element 130 having the third rotation angle θ3 and thus transmitted to the light combination element 120. A first part CBP3 of the conversion beam CB2 transmitted to the dichroic portion 122 of the light combination element 120 is transmitted to the filter module 170 through the lens element 184. A second part CBP4 of the conversion beam CB2 transmitted to the penetration portion 124 of the light combination element 120 is transmitted to the filter module 170 after sequentially passing through the partially transmissive partially reflective element 160 and the lens element 184. The filter area F3 of the filter module 170 allows at least a portion of the conversion beam CB2 to pass through. In other words, the illumination system 100 outputs the conversion beam CB2 within the third time period.

It should be noted that the sizes of the first rotation angle θ1, the second rotation angle θ2 and the third rotation angle θ3 may be changed according to dimensions, relative distances and relative configuration relationships of the reflection area R, the light conversion area C1 and the light conversion area C2, and other parameters, and are not limited to those shown in FIG. 1A to FIG. 1C.

The actuator 150 controls at least one of the rotation angle and rotation direction of the reflection element 130, such that the excitation beam B transmitted from the reflection element 130 is transmitted to different optical areas (such as the reflection area R, the light conversion area C1 and the light conversion area C2) on the light wavelength conversion module 140 in different time periods, and thus the illumination system 100 output different color beams (such as the blue beam, the red beam and the green beam) in different time periods. Therefore, the light wavelength conversion module 140 may not rotate. That is to say, the positions of the reflection area R, the light conversion area C1 and the light conversion area C2 may be fixed during the provision of the excitation beam B emitted from the excitation light source 110. Therefore, the projection apparatus 10 may adopt the light valve 200 only supporting synchronous rotation with the filter module 170, thereby reducing the cost. Accordingly, the illumination system 100 and the projection method of the projection apparatus 10 are conducive to reduction of the cost of the projection apparatus 10, such that the projection apparatus 10 may have the advantage of low cost.

Figure 6A:
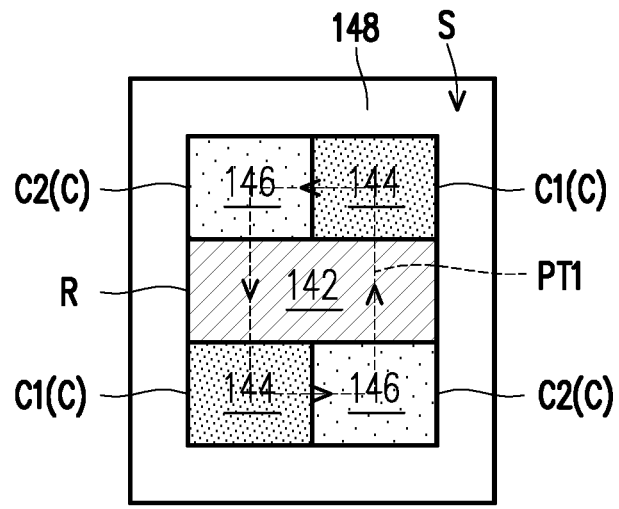
FIG. 6A to FIG. 6C are front views of other implementation types of a light wavelength conversion module in the first embodiment of the invention respectively.
Figure 6B:
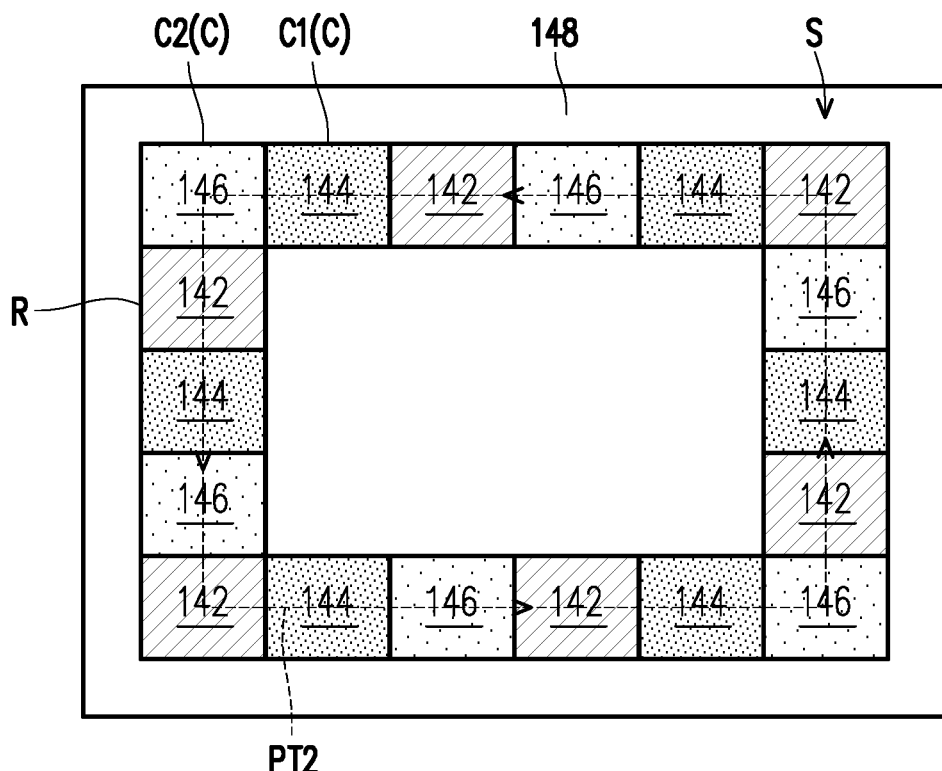
Figure 6C:
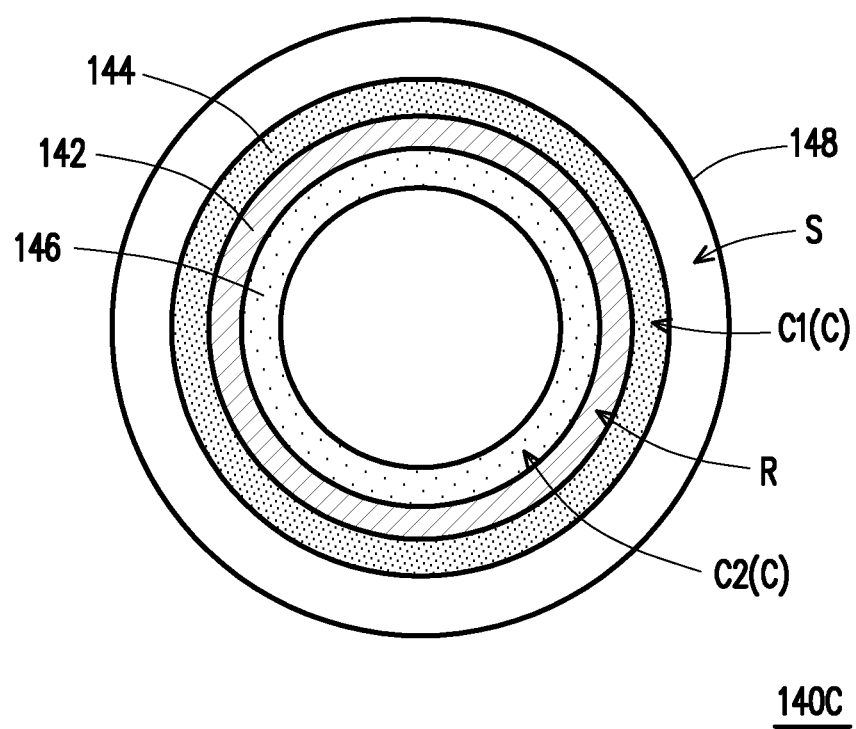

FIG. 6A to FIG. 6C are front views of other implementation types of a light wavelength conversion module in the first embodiment of the invention respectively. The light wavelength conversion module in FIG. 6A to FIG. 6C is similar to the light wavelength conversion module in FIG. 3. These light wavelength conversion modules are mainly different in the arrangement manner of the at least one reflection area R and the at least one light conversion area C. Specifically, in FIG. 6A and FIG. 6B, the at least one reflection area R and the at least one light conversion area C are distributed in a surrounding form. In FIG. 6C, the at least one reflection area R and the at least one light conversion area C are distributed in a concentric circle form.

Referring to FIG. 6A, a light wavelength conversion module 140A has one reflection area R, two light conversion areas C1 and two light conversion areas C2. The two light conversion areas C1 are disposed on two opposite sides of the reflection area R along a diagonal line of the reflection area R, and the two light conversion areas C2 are disposed on two opposite sides of the reflection area R along another diagonal line of the reflection area R. Under this framework, the speckle projected to the light wavelength conversion module 140A may be projected to the reflection area R, the light conversion area C1 and the light conversion area C2 (along, for example, a path PT1 as shown in FIG. 6A) in turns by controlling at least one of the rotation angle and rotation direction of the reflection element via the actuator.

Referring to FIG. 6B, a light wavelength conversion module 140B may have a plurality of reflection areas R, a plurality of light conversion areas C1 and a plurality of light conversion areas C2, and the plurality of reflection areas R, the plurality of light conversion areas C1 and the plurality of light conversion areas C2 are alternately arranged into a ring. Under this framework, the speckle projected to the light wavelength conversion module 140B may be projected to the reflection area R, the light conversion area C1 and the light conversion area C2 (along, for example, a path PT2 as shown in FIG. 6B) in turns by controlling at least one of the rotation angle and rotation direction of the reflection element via the actuator.

Referring to FIG. 6C, a light wavelength conversion module 140C may have one reflection area R, one light conversion area C1 and one light conversion area C2. The reflection area R, the light conversion area C1 and the light conversion area C2 are annular and share a center of circle. Under this framework, the light wavelength conversion module 140C may rotate or may not rotate. If the light wavelength conversion module 140C rotates (may not rotate synchronously with the filter module 170), the heat dissipation effect of the light wavelength conversion module 140C may be improved. In addition, the speckle projected to the light wavelength conversion module 140C may be projected to the reflection area R, the light conversion area C1 and the light conversion area C2 in turns by controlling at least one of the rotation angle and rotation direction of the reflection element via the actuator.

Based on the foregoing, the first embodiment of the invention has at least one of the following advantages or effects. In the illumination system and the projection method of the projection apparatus of the first embodiment, an actuator controls at least one of the rotation angle and rotation direction of a reflection element, such that an excitation beam transmitted from the reflection element is transmitted to different optical areas on a light wavelength conversion module in different time periods. Therefore, the rotation of a filter module and the rotation of the light wavelength conversion module may not be synchronous (the light wavelength conversion module may rotate or may not rotate). That is to say, the projection apparatus using the illumination system and the projection method of the projection apparatus of the first embodiment may adopt a light valve only supporting synchronous rotation with the filter module, thereby reducing the cost. Accordingly, the illumination system and the projection method of the projection apparatus of the first embodiment are conducive to reduction of the cost of the projection apparatus, such that the projection apparatus of the first embodiment may have the advantage of low cost. In the first embodiment, a heat sink may be selectively provided for assisting the light wavelength conversion module in heat dissipation, thereby improving the conversion efficiency. In addition, the light wavelength conversion module may not rotate, thereby reducing the number of needed motors. The aforementioned projection method of the projection apparatus refers to that a processor inside the projection apparatus may operate relevant elements in the projection apparatus to generate an illumination beam and an image beam according to the settings of various elements inside the projection apparatus and the settings of a user.

Figure 7A:
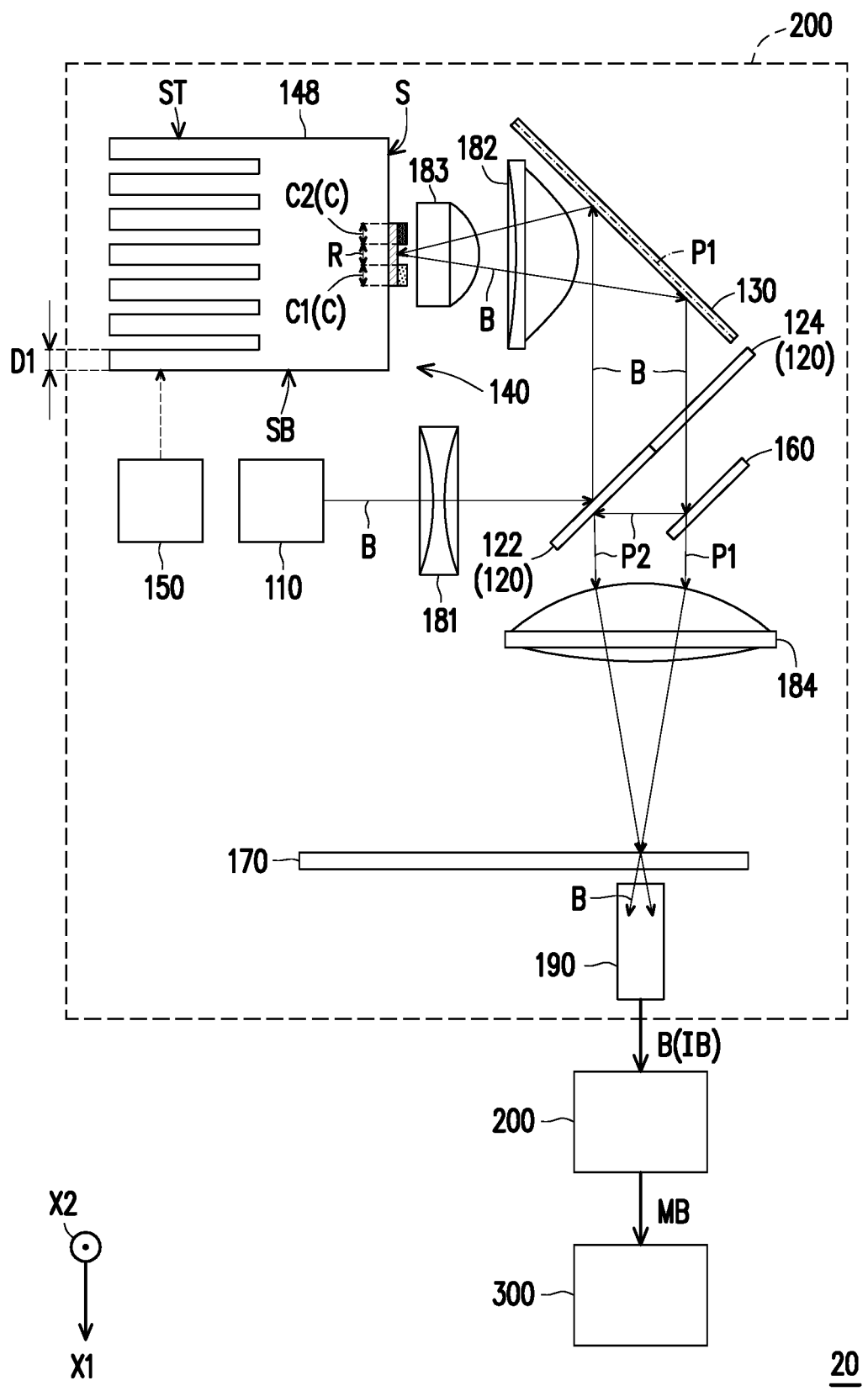
FIG. 7A to FIG. 7C are schematic diagrams of a projection apparatus within a first time period to a third time period in a second embodiment of the invention respectively.
Figure 7B:
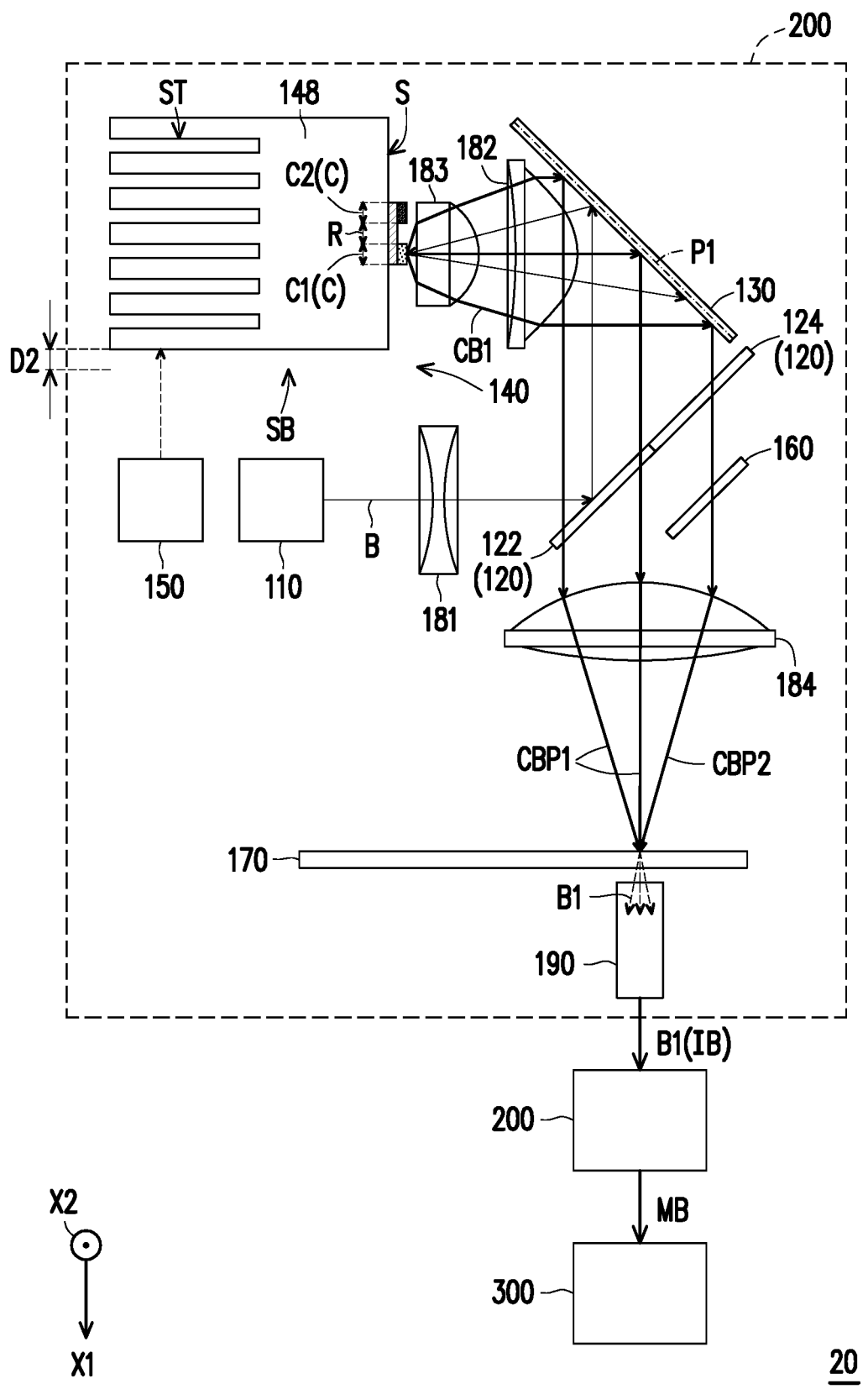
Figure 7C:
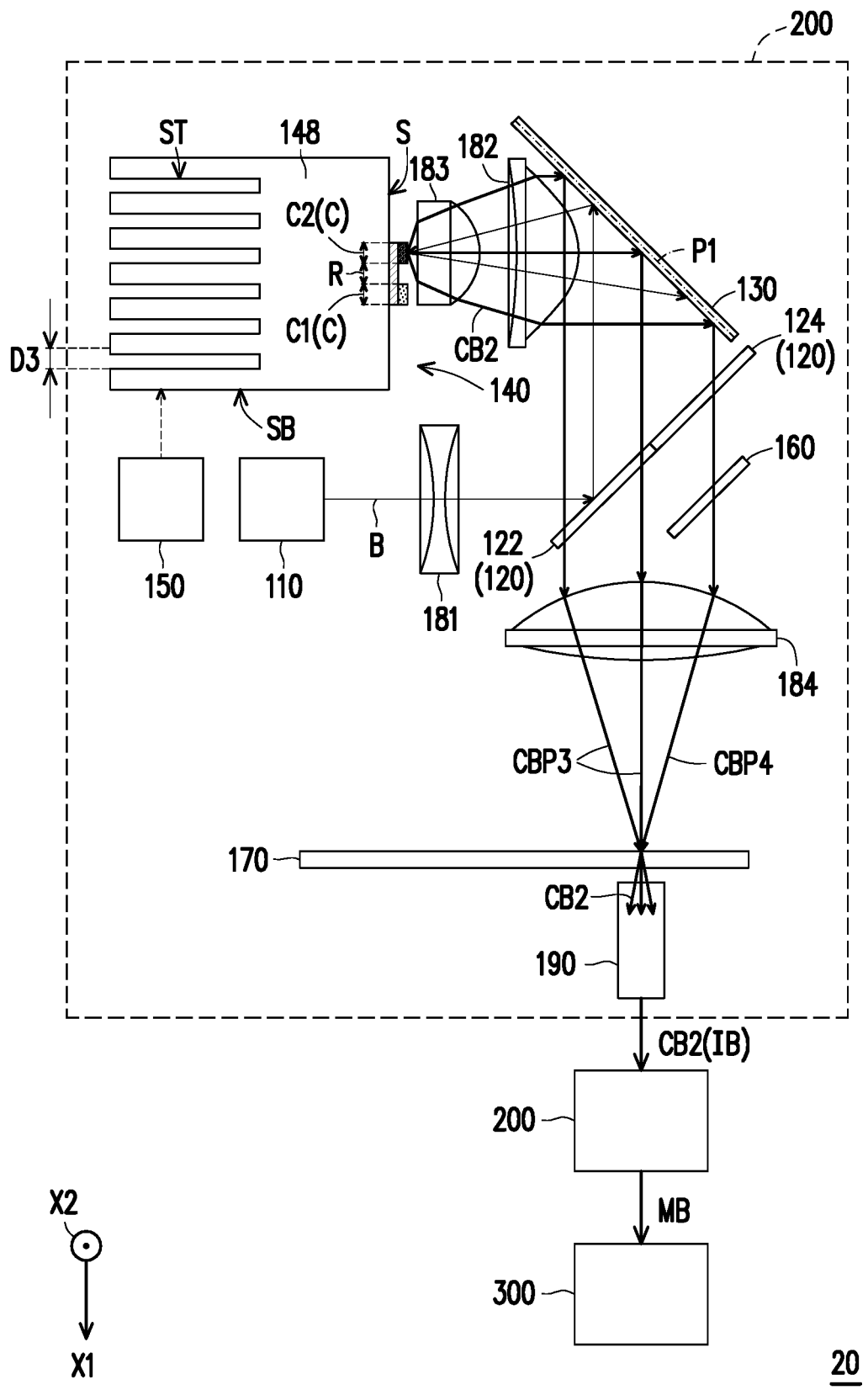
Figure 8:
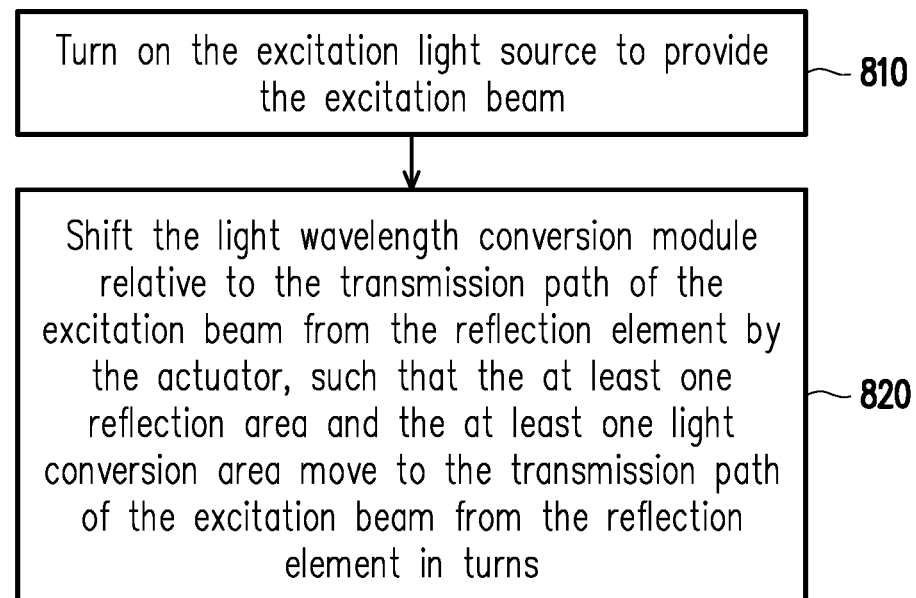
FIG. 8 is a flowchart of a projection method of the projection apparatus in the second embodiment of the invention.

FIG. 7A to FIG. 7C are schematic diagrams of a projection apparatus within a first time period to a third time period in a second embodiment of the invention respectively. FIG. 8 is a flowchart of a projection method of the projection apparatus in the second embodiment of the invention.

Referring to FIG. 7A to FIG. 7C, a projection apparatus 20 of the second embodiment is similar to the foregoing projection apparatus 10 of the first embodiment (referring to FIG. 1A to FIG. 1C). The main differences between the two embodiments are described below.

In the illumination system 100 of the projection apparatus 10, the actuator 150 is coupled to the reflection element 130 to control at least one of the rotation angle and rotation direction of the reflection element 130, such that the excitation beam B transmitted from the reflection element 130 is transmitted to different optical areas on the light wavelength conversion module 140 in different time periods via different transmission paths. In addition, the position of the light wavelength conversion module 140 is fixed during the provision of the excitation beam B emitted from the excitation light source 110 (in addition, the light wavelength conversion module 140 may rotate or not rotate at the fixed position).

On the other hand, in the illumination system 200 of the projection apparatus 20, the actuator 150 is coupled to the light wavelength conversion module 140 to shift the light wavelength conversion module 140 relative to the transmission path of the excitation beam B transmitted from the reflection element 130, such that the reflection area R and the light conversion area C move to the transmission path of the excitation beam B transmitted from the reflection element 130 in turns. In addition, the transmission path of the excitation beam B transmitted from the reflection element 130 is fixed during the provision of the excitation beam B emitted from the excitation light source 110. That is to say, the reflection element 130 is designed to be fixed without rotation during the provision of the excitation beam B emitted from the excitation light source 110.

A projection method of the projection apparatus 20 includes steps as follow. First, turning on the excitation light source 110 to provide the excitation beam B (Step 810); and then, shifting the light wavelength conversion module 140 relative to the transmission path of the excitation beam B transmitted from the reflection element 130 by the actuator 150, such that the reflection area R and the light conversion area C move to the transmission path of the excitation beam B transmitted from the reflection element 130 in turns (Step 820).

In particular, referring to FIG. 7A, the filter area F1 (referring to FIG. 4) of the filter module 170 cuts into the transmission path of the light beam transmitted from the lens element 184 within a first time period. The light wavelength conversion module 140 shifts to a first position via the actuator 150 (for example, moves a distance D1 along a direction X1 from a third position where the light wavelength conversion module 140 is located in FIG. 7C), such that the reflection area R moves to the transmission path of the excitation beam B transmitted from the reflection element 130. The transmission path of the excitation beam B within the first time period may be described with reference to FIG. 1A, and the descriptions thereof are omitted herein.

Referring to FIG. 7B, the filter area F2 (referring to FIG. 4) of the filter module 170 cuts into the transmission path of the light beam transmitted from the lens element 184 within a second time period. The light wavelength conversion module 140 shifts to a second position different from the first position via the actuator 150 (for example, moves a distance D2 along the direction X1 from the first position where the light wavelength conversion module 140 is located in FIG. 7A), such that the light conversion area C1 moves to the transmission path of the excitation beam B transmitted from the reflection element 130. The transmission paths of the excitation beam B and the conversion beam CB1 are similar to those of the excitation beam B and the conversion beam CB1 in FIG. 1B within the second time period. The two figures are mainly different in that the reflection element 130 in FIG. 7B does not rotate and the light wavelength conversion module 140 in FIG. 7B shifts to the second position.

Referring to FIG. 7C, the filter area F3 (referring to FIG. 4) of the filter module 170 cuts into the transmission path of the light beam transmitted from the lens element 184 within a third time period. The light wavelength conversion module 140 shifts to the third position different from the second position via the actuator 150 (for example, moves a distance D3 along the direction X1 from the second position where the light wavelength conversion module 140 is located in FIG. 7B), such that the light conversion area C2 moves to the transmission path of the excitation beam B transmitted from the reflection element 130. The transmission paths of the excitation beam B and the conversion beam CB2 are similar to those of the excitation beam B and the conversion beam CB2 in FIG. 1C within the third time period. The two figures are mainly different in that the reflection element 130 in FIG. 7C does not rotate and the light wavelength conversion module 140 in FIG. 7C shifts to the third position.

It should be noted that the sizes of the distance D, the distance D2 and the distance D3 may be changed according to dimensions, relative distances and relative configuration relationships of the reflection area R, the light conversion area C1 and the light conversion area C2, and other parameters, and are not limited to those shown in FIG. 7A to FIG. 7C.

In the second embodiment, in addition to the light wavelength conversion module 140 as shown in FIG. 3, the illumination system 200 may also adopt the light wavelength conversion module 140A as shown in FIG. 6A, the light wavelength conversion module 140B as shown in FIG. 6B or the light wavelength conversion module 140C as shown in FIG. 6C.

When the light wavelength conversion module in FIG. 3, FIG. 6A or FIG. 6B is adopted, the light wavelength conversion module may not rotate during the provision of the excitation beam B emitted from the excitation light source 110. That is to say, the positions of the reflection area R, the light conversion area C1 and the light conversion area C2 are fixed during the provision of the excitation beam B emitted from the excitation light source 110. On the other hand, when the light wavelength conversion module in FIG. 6C is adopted, the light wavelength conversion module 140C may rotate or may not rotate during the provision of the excitation beam B emitted from the excitation light source 110. If the light wavelength conversion module 140C rotates (may not rotate synchronously with the filter module 170), the heat dissipation effect of the light wavelength conversion module 140C may be improved.

When the light wavelength conversion module (that is, the reflection area R, the light conversion area C1 and the light conversion area C2 are distributed in a strip form or a concentric circle form) in FIG. 3 or FIG. 6C is adopted, the light wavelength conversion module may shift in a one-dimensional direction (such as the direction X1 and the opposite direction thereof) through the actuator 150, such that the excitation beam B transmitted from the reflection element 130 is transmitted to different optical areas (such as the reflection area R, the light conversion area C1 and the light conversion area C2) on the light wavelength conversion module in different time periods. On the other hand, when the light wavelength conversion module (that is, the reflection area R, the light conversion area C1 and the light conversion area C2 are distributed in a surrounding form) in FIG. 6A or FIG. 6B is adopted, the light wavelength conversion module may shift in a two-dimensional direction (such as the direction X1 and the opposite direction thereof, and the direction X2 and the opposite direction thereof) through the actuator 150, such that the excitation beam B transmitted from the reflection element 130 is transmitted to different optical areas (such as the reflection area R, the light conversion area C1 and the light conversion area C2) on the light wavelength conversion module in different time periods.

Based on the foregoing, the second embodiment of the invention has at least one of the following advantages or effects. In the illumination system and the projection method of the projection apparatus in the second embodiment, an actuator controls a light wavelength conversion module to shift relative to a transmission path of an excitation beam transmitted from a reflection element, such that a reflection area and a light conversion area move to the transmission path of the excitation beam transmitted from the reflection element in turns. Therefore, the rotation of a filter module and the rotation of the light wavelength conversion module may not be synchronous (the light wavelength conversion module may rotate or may not rotate). That is to say, the projection apparatus using the illumination system and the projection method of the projection apparatus of the second embodiment may adopt a light valve only supporting synchronous rotation with the filter module, thereby reducing the cost. Accordingly, the illumination system and the projection method of the projection apparatus of the second embodiment are conducive to reduction of the cost of the projection apparatus, such that the projection apparatus of the second embodiment may have the advantage of low cost. In the second embodiment, a heat sink may be selectively provided for assisting the light wavelength conversion module in heat dissipation, thereby improving the conversion efficiency. In addition, the light wavelength conversion module may not rotate, thereby reducing the number of needed motors.

Figure 9A:
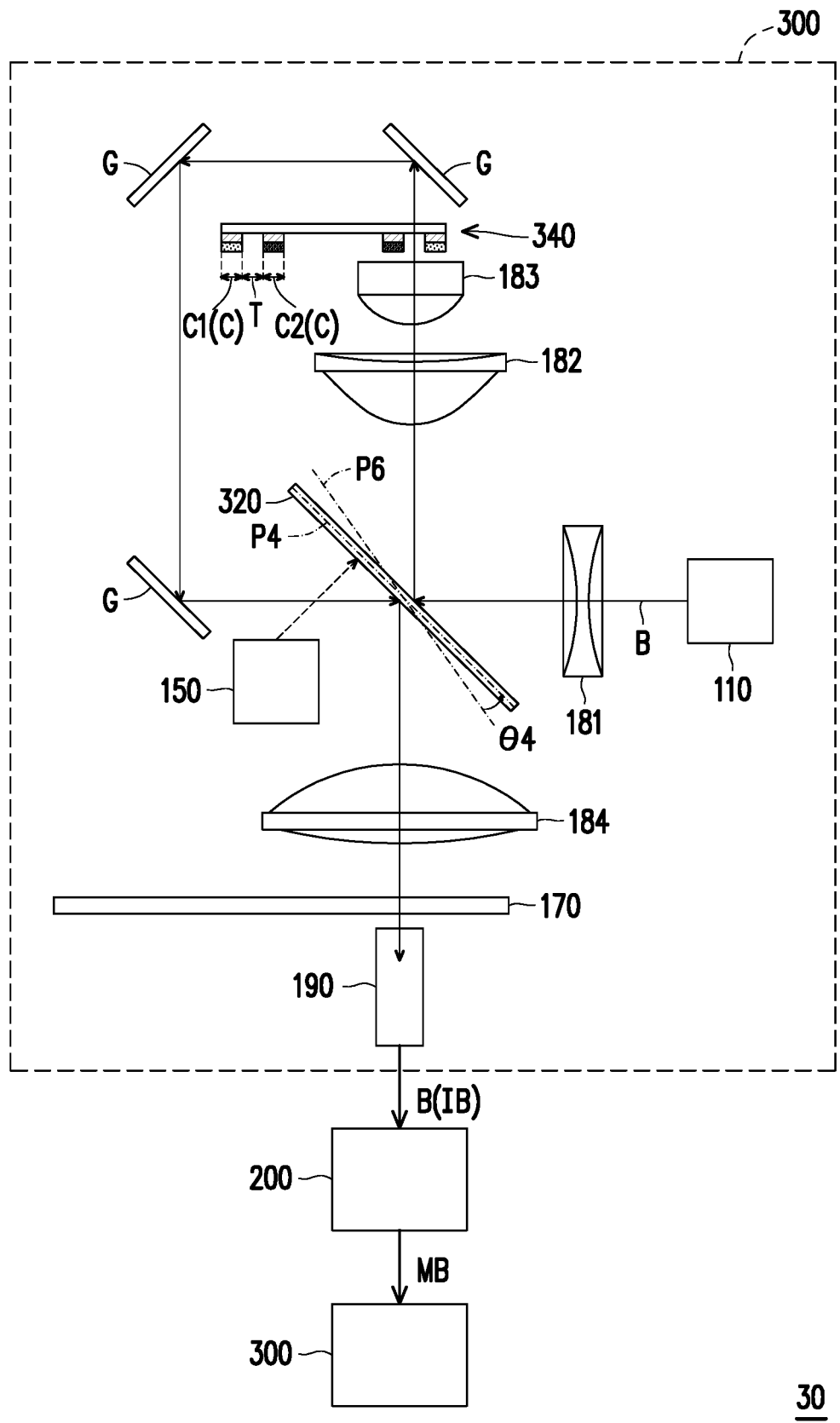
FIG. 9A to FIG. 9C are schematic diagrams of a projection apparatus within a first time period to a third time period in a third embodiment of the invention respectively.
Figure 9B:
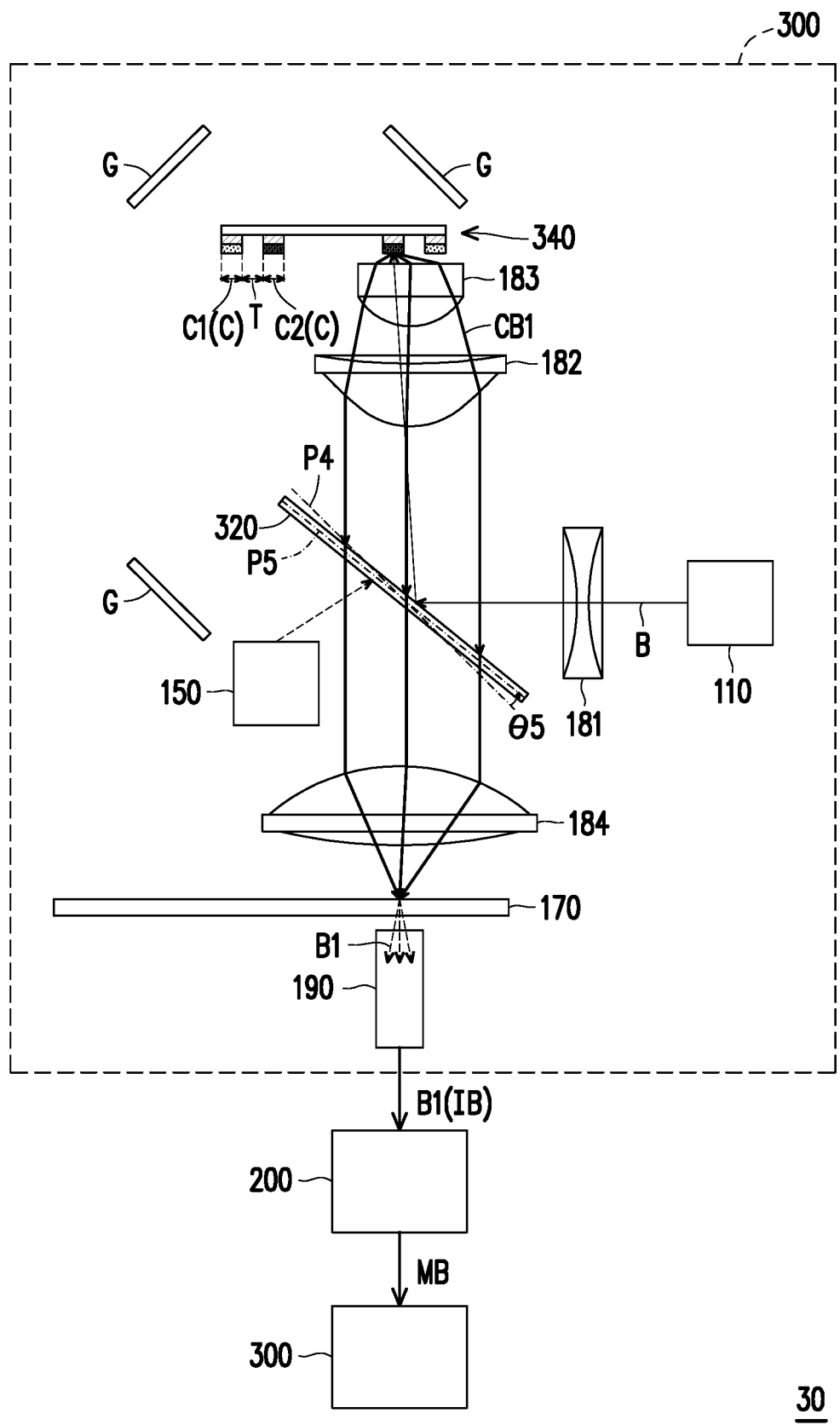
Figure 9C:
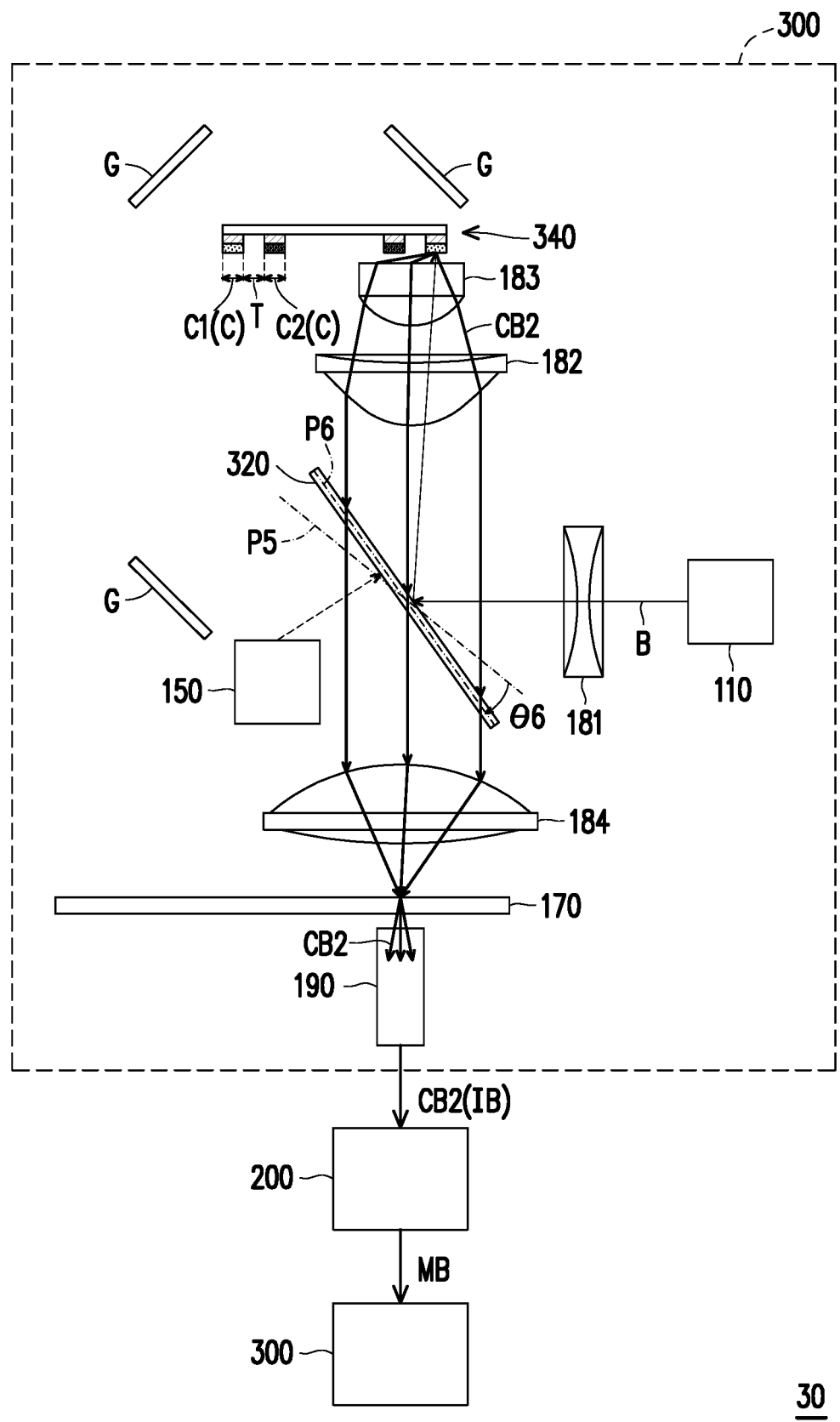
Figure 10:
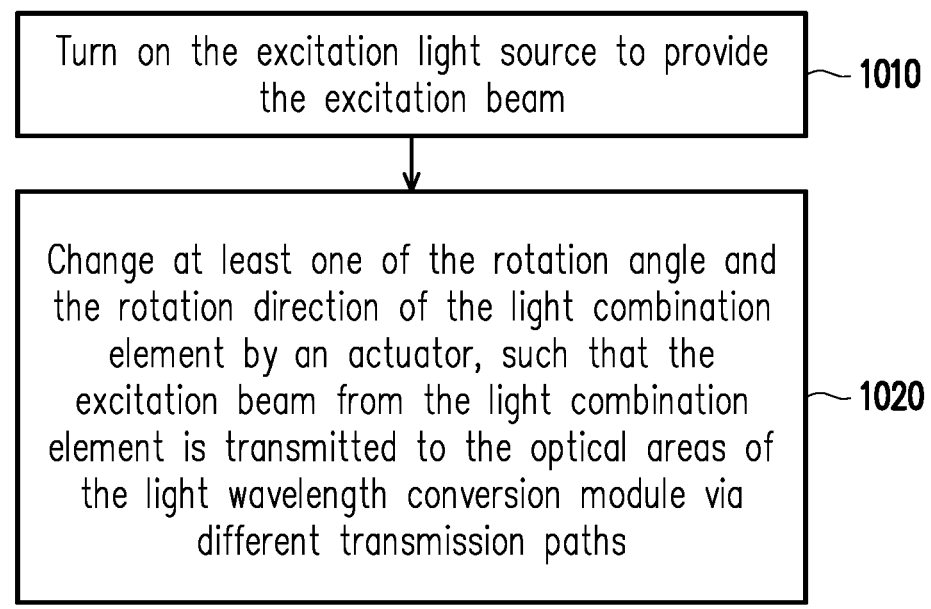
FIG. 10 is a flowchart of a projection method of the projection apparatus in the third embodiment of the invention.

FIG. 9A to FIG. 9C are schematic diagrams of a projection apparatus within a first time period to a third time period in a third embodiment of the invention respectively. FIG. 10 is a flowchart of a projection method of the projection apparatus in the third embodiment of the invention. Referring to FIG. 9A to FIG. 9C, a projection apparatus 30 of the third embodiment is similar to the foregoing projection apparatus 10 of the first embodiment (referring to FIG. 1A to FIG. 1C). The main differences between the two embodiments are described below.

In the projection apparatus 30, the reflection element 130 in FIG. 1A to FIG. 1C is not provided in an illumination system 300, and a light wavelength conversion module 340 is disposed on a transmission path of an excitation beam B transmitted from a light combination element 320.

The light wavelength conversion module 340 has a plurality of optical areas. The plurality of optical areas include at least one penetration area T and at least one light conversion area C. The penetration area T is adapted to allow the excitation beam B to pass through, and the light conversion area C (such as a light conversion area C1 and a light conversion area C2) is adapted to convert the excitation beam B into a conversion beam (such as a conversion beam CB1 and a conversion beam CB2) and reflect the conversion beam. For example, a light wavelength conversion material and a reflection layer (or a reflection element) may be provided in the light conversion area C. In addition, light scattering particles may also be selectively provided in the light conversion area C to improve the conversion efficiency.

In the embodiment, the plurality of optical areas include a penetration area T and two light conversion areas C (such as the light conversion area C1 and the light conversion area C2). In addition, the penetration area T, the light conversion area C1 and the light conversion area C2 are distributed in a concentric circle form as shown in FIG. 6C. However, the respective number of penetration areas T and light conversion areas C in the light wavelength conversion module 340 and the arrangement manner of the penetration areas T and the light conversion areas C are not limited to those shown in FIG. 9A to FIG. 9C.

The illumination system 300 further includes a plurality of light guide elements G. The plurality of light guide elements G are disposed on the transmission path of the excitation beam B passing through the penetration area T, so as to transfer the excitation beam B passing through the penetration area T back to the light combination element 320. For example, the plurality of light guide elements G may be, but are not limited to, reflection mirrors, respectively.

The light combination element 320 is also disposed on, in addition to the transmission path of the excitation beam B emitted from the excitation light source 110, the transmission path of the conversion beam (such as the conversion beam CB1 and the conversion beam CB2) reflected by the light conversion area C and the transmission path of the excitation beam B transmitted from the plurality of light guide elements G. In the embodiment, the light combination element 320 is designed to reflect the excitation beam B and allow the conversion beam CB1 and the conversion beam CB2 to pass through. The light combination element 320 is, for example, a dichroic mirror, adapted to reflect the excitation beam B and allow the conversion beam CB1 and the conversion beam CB2 to pass through.

The actuator 150 is coupled to the light combination element 320 to change at least one of a rotation angle and rotation direction of the light combination element 320, thereby transferring the excitation beam B transmitted from the light combination element 320 to the plurality of optical areas (such as the penetration area T, the light conversion area C1 and the light conversion area C2) of the light wavelength conversion module 340 via different transmission paths.

A projection method of the projection apparatus 30 includes steps as follow. First, turning on the excitation light source 110 to provide the excitation beam B (Step 1010); and then, changing at least one of the rotation angle and rotation direction of the light combination element 320 by the actuator 150, such that the excitation beam B transmitted from the light combination element 320 is transmitted to the plurality of optical areas of the light wavelength conversion module 340 via different transmission paths (Step 1020).

In particular, referring to FIG. 9A, the filter area F1 (referring to FIG. 4) of the filter module 170 cuts into the transmission path of the light beam transmitted from the lens element 184 within a first time period. By means of the actuator 150, the light combination element 320 has the first rotation angle θ4 (for example, rotates counterclockwise by the first rotation angle θ4 from the inclination plane P6 where the light combination element 320 is located in FIG. 9C to the inclination plane P4), such that the excitation beam B emitted from the excitation light source 110 is transmitted back to the light combination element 320 having the first rotation angle θ4 sequentially via the lens element 181, the light combination element 320 having the first rotation angle θ4, the lens element 182, the lens element 183, the penetration area T of the light wavelength conversion module 340, and the plurality of light guide elements G. The excitation beam B is then reflected by the light combination element 320 having the first rotation angle θ4 and transmitted to the filter module 170 through the lens element 184. The filter area F1 of the filter module 170 allows at least a portion of the excitation beam B to pass through.

Referring to FIG. 9B, the filter area F2 of the filter module 170 cuts into the transmission path of the light beam transmitted from the lens element 184 within a second time period. By means of the actuator 150, the light combination element 320 has a second rotation angle θ5 (for example, rotates counterclockwise by the second rotation angle θ5 from the inclination plane P4 where the light combination element 320 is located in FIG. 9A to the inclination plane P5), such that the excitation beam B emitted from the excitation light source 110 is transmitted to the light conversion area C1 of the light wavelength conversion module 340 sequentially via the lens element 181, the light combination element 320 having the second rotation angle θ5, the lens element 182, and the lens element 183. The light conversion area C1 converts the excitation beam B into the conversion beam CB1 and reflects the conversion beam CB1. The conversion beam CB1 reflected by the light conversion area C1 is transmitted to the light combination element 320 having the second rotation angle θ5 sequentially via the lens element 183 and the lens element 182. The conversion beam CB1 transmitted to the light combination element 320 having the second rotation angle θ5 is then transmitted to the filter module 170 after sequentially passing through the light combination element 320 and the lens element 184. The filter area F2 of the filter module 170 allows the first color beam B 1 (such as the red beam) in the conversion beam CB1 (such as the yellow beam) to pass through, and filters out/absorbs the green beam in the conversion beam CB1.

Referring to FIG. 9C, the filter area F3 of the filter module 170 cuts into the transmission path of the light beam transmitted from the lens element 184 within a third time period. By means of the actuator 150, the light combination element 320 has a third rotation angle θ6 (for example, rotates clockwise by the third rotation angle θ6 from the inclination plane P5 where the light combination element 320 is located in FIG. 9B to the inclination plane P6), such that the excitation beam B emitted from the excitation light source 110 is transmitted to the light conversion area C2 of the light wavelength conversion module 340 sequentially via the lens element 181, the light combination element 320 having the third rotation angle θ6, the lens element 182, and the lens element 183. The light conversion area C2 converts the excitation beam B into the conversion beam CB2 and reflects the conversion beam CB2. The conversion beam CB2 reflected by the light conversion area C2 is transmitted to the light combination element 320 having the third rotation angle θ6 sequentially via the lens element 183 and the lens element 182. The conversion beam CB2 transmitted to the light combination element 320 having the third rotation angle θ6 is then transmitted to the filter module 170 after sequentially passing through the light combination element 320 and the lens element 184. The filter area F3 of the filter module 170 allows at least a portion of the conversion beam CB2 to pass through.

It should be noted that the sizes of the first rotation angle θ1, the second rotation angle θ2 and the third rotation angle θ3 may be changed according to dimensions, relative distances and relative configuration relationships of the penetration area T, the light conversion area C1 and the light conversion area C2, and other parameters, and are not limited to those shown in FIG. 9A to FIG. 9C.

In the third embodiment, the penetration area T, the light conversion area C1 and the light conversion area C2 of the light wavelength conversion module 340 may be distributed in a concentric circle form as shown in FIG. 6C (the reflection area R in FIG. 6C is replaced with the penetration area T, and the reflection layer 142 is not disposed in the penetration area T). Under this framework, the light wavelength conversion module 340 may rotate or may not rotate during the provision of the excitation beam B emitted from the excitation light source 110. If the light wavelength conversion module 340 rotates (may not rotate synchronously with the filter module 170), the heat dissipation effect of the light wavelength conversion module 340 may be improved.

In the third embodiment, the penetration area T, the light conversion area C1 and the light conversion area C2 of the light wavelength conversion module 340 may also be distributed in a strip form as shown in FIG. 3, in a surrounding form as shown in FIG. 6A, or in a surrounding form as shown in FIG. 6B (but the reflection area R in FIG. 3, FIG. 6A and FIG. 6B is replaced with the penetration area T, and the reflection layer 142 is not disposed in the penetration area T). When the penetration area T, the light conversion area C1 and the light conversion area C2 are arranged in a manner in FIG. 3, FIG. 6A or FIG. 6B, the light wavelength conversion module may not rotate during the provision of the excitation beam B emitted from the excitation light source 110. That is to say, the positions of the plurality of optical areas (such as the reflection area R, the light conversion area C1 and the light conversion area C2) may be fixed during the provision of the excitation beam B emitted from the excitation light source 110.

Based on the foregoing, the third embodiment of the invention has at least one of the following advantages or effects. In the illumination system and the projection method of the projection apparatus of the third embodiment, an actuator controls at least one of the rotation angle and rotation direction of a light combination element, such that an excitation beam transmitted from the light combination element is transmitted to different optical areas on a light wavelength conversion module in different time periods. Therefore, the rotation of a filter module and the rotation of the light wavelength conversion module may be not synchronous (the light wavelength conversion module may rotate or may not rotate). That is to say, the projection apparatus using the illumination system and the projection method of the projection apparatus of the third embodiment may adopt a light valve only supporting synchronous rotation with the filter module, thereby reducing the cost. Accordingly, the illumination system and the projection method of the projection apparatus of the third embodiment are conducive to reduction of the cost of the projection apparatus, such that the projection apparatus of the third embodiment may have the advantage of low cost. In the third embodiment, the light wavelength conversion module may not rotate, thereby reducing the quantity of needed motors.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the present disclosure is intended to be dedicated to the public regardless of whether the element or component is explicitly recited in the following claims.

What is claimed is:

1. A projection apparatus, comprising:
an illumination system, comprising:
an excitation light source, adapted to provide an excitation beam;
a light combination element, disposed on a transmission path of the excitation beam emitted from the excitation light source;
a light wavelength conversion module, disposed on a transmission path of the excitation beam transmitted from the light combination element, wherein the light wavelength conversion module comprises a plurality of optical areas; and
an actuator, coupled to the light combination element to change a rotation angle of the light combination element, such that the excitation beam transmitted from the light combination element is transmitted to the plurality of optical areas of the light wavelength conversion module via different transmission paths;
a light valve, disposed on a transmission path of an illumination beam output from the illumination system, wherein the light valve converts the illumination beam into an image beam; and
a projection lens, disposed on a transmission path of the image beam.

2. The projection apparatus according to claim 1, wherein the plurality of optical areas of the light wavelength conversion module comprise at least one penetration area and at least one light conversion area, the at least one penetration area allows the excitation beam to pass through, the at least one light conversion area converts the excitation beam into a conversion beam and reflects the conversion beam, the illumination system further comprises a plurality of light guide elements, the plurality of light guide elements are disposed on a transmission path of the excitation beam passing through the at least one penetration area, and the light combination element is also disposed on a transmission path of the conversion beam reflected by the at least one light conversion area and a transmission path of the excitation beam transmitted from the plurality of light guide elements.

3. The projection apparatus according to claim 2, wherein within a first time period, the light combination element comprises a first rotation angle, and the excitation beam emitted from the excitation light source is transmitted back to the light combination element comprising the first rotation angle sequentially via the light combination element comprising the first rotation angle, the at least one penetration area and the plurality of light guide elements; and
within a second time period, the light combination element comprises a second rotation angle, the excitation beam emitted from the excitation light source is transmitted to the at least one light conversion area via the light combination element comprising the second rotation angle, and the conversion beam reflected by the at least one light conversion area is transmitted to the light combination element comprising the second rotation angle.

4. The projection apparatus according to claim 2, wherein the at least one penetration area and the at least one light conversion area are distributed in a strip form, a surrounding form or a concentric circle form.

5. The projection apparatus according to claim 2, wherein the illumination system further comprises:
a filter module, wherein the conversion beam reflected by the at least one light conversion area and the excitation beam transmitted from the plurality of light guide elements are transmitted toward the filter module via the light combination element.

6. The projection apparatus according to claim 5, wherein rotation of the light wavelength conversion module and rotation of the filter module are not synchronous.

7. An illumination system, comprising:
an excitation light source, adapted to provide an excitation beam;
a light combination element, disposed on a transmission path of the excitation beam emitted from the excitation light source;
a light wavelength conversion module, disposed on a transmission path of the excitation beam transmitted from the light combination element, wherein the light wavelength conversion module comprises a plurality of optical areas; and
an actuator, coupled to the light combination element to change a rotation angle of the light combination element, such that the excitation beam transmitted from the light combination element is transmitted to the plurality of optical areas of the light wavelength conversion module via different transmission paths.

8. The illumination system according to claim 7, wherein the plurality of optical areas of the light wavelength conversion module comprise at least one penetration area and at least one light conversion area, the at least one penetration area allows the excitation beam to pass through, the at least one light conversion area converts the excitation beam into a conversion beam and reflects the conversion beam, the illumination system further comprises a plurality of light guide elements, the plurality of light guide elements are disposed on a transmission path of the excitation beam passing through the at least one penetration area, and the light combination element is also disposed on a transmission path of the conversion beam reflected by the at least one light conversion area and a transmission path of the excitation beam transmitted from the plurality of light guide elements.

9. The illumination system according to claim 8, wherein within a first time period, the light combination element comprises a first rotation angle, and the excitation beam emitted from the excitation light source is transmitted back to the light combination element comprising the first rotation angle sequentially via the light combination element comprising the first rotation angle, the at least one penetration area and the plurality of light guide elements; and
within a second time period, the light combination element comprises a second rotation angle, the excitation beam emitted from the excitation light source is transmitted to the at least one light conversion area via the light combination element comprising the second rotation angle, and the conversion beam reflected by the at least one light conversion area is transmitted to the light combination element comprising the second rotation angle.

10. The illumination system according to claim 8, wherein the at least one penetration area and the at least one light conversion area are distributed in a strip form, a surrounding form or a concentric circle form.

11. The illumination system according to claim 8, further comprising:
a filter module, wherein the conversion beam reflected by the at least one light conversion area and the excitation beam transmitted from the plurality of light guide elements are transmitted toward the filter module via the light combination element.

12. The illumination system according to claim 11, wherein rotation of the light wavelength conversion module and rotation of the filter module are not synchronous.

13. A projection method of a projection apparatus, applied to an illumination system of the projection apparatus, the illumination system comprising: an excitation light source, a light combination element, a reflection element, a light wavelength conversion module, and an actuator, wherein the light wavelength conversion module comprises a plurality of optical areas, the projection method comprising:
turning on the excitation light source to provide an excitation beam; and
changing a rotation angle of the light combination element by the actuator, such that the excitation beam transmitted from the light combination element is transmitted to the plurality of optical areas of the light wavelength conversion module via different transmission paths.

14. The projection method of the projection apparatus according to claim 13, wherein positions of the plurality of optical areas are fixed during provision of the excitation beam emitted from the excitation light source.

15. The projection method of the projection apparatus according to claim 13, wherein
within a first time period, the light combination element comprises a first rotation angle via the actuator, such that the excitation beam emitted from the excitation light source is transmitted back to the light combination element comprising the first rotation angle sequentially via the light combination element comprising the first rotation angle, at least one penetration area in the plurality of optical areas and a plurality of light guide elements; and
within a second time period, the light combination element comprises a second rotation angle via the actuator, such that the excitation beam emitted from the excitation light source is transmitted to at least one light conversion area in the plurality of optical areas via the light combination element comprising the second rotation angle, and a conversion beam reflected by the at least one light conversion area is transmitted to the light combination element comprising the second rotation angle.

16. The projection method of the projection apparatus according to claim 15, further comprising:
rotating a filter module, such that a plurality of filter areas of the filter module cut into transmission paths of the excitation beam transmitted from the light combination element and the conversion beam in turns, wherein rotation of the light wavelength conversion module and rotation of the filter module are not synchronous.

* * * * *